D. HOBART.
WEIGHING SCOOP FOR SCALES.
APPLICATION FILED AUG. 28, 1912.
1,061,841.
Patented May 13, 1913.
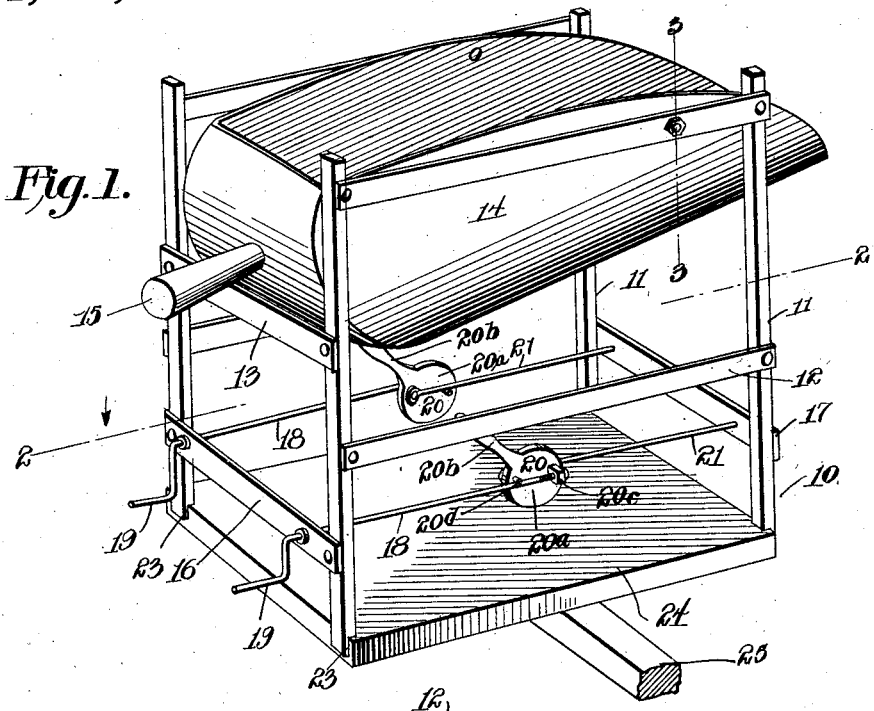
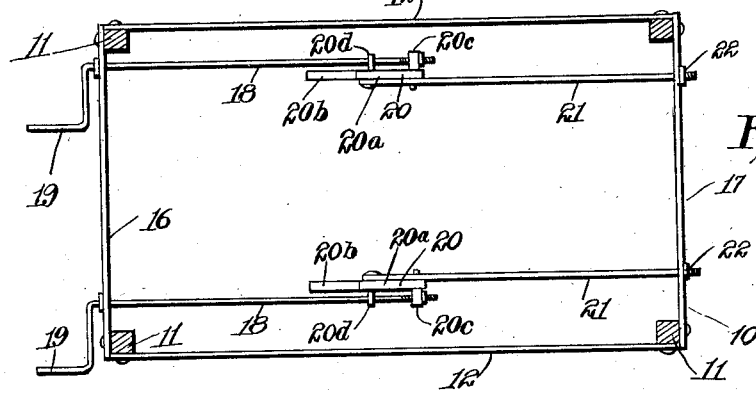
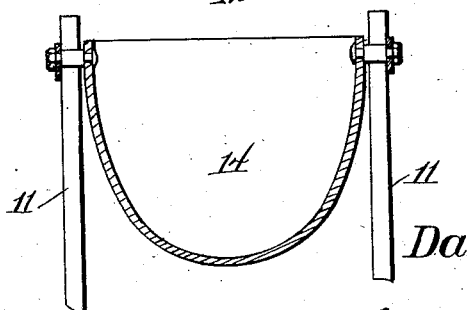
Inventor
Darwin Hobart.
Witnesses
Wm. H. Mulligan.
By Victor J. Evans.
Attorney

UNITED STATES PATENT OFFICE.

DARWIN HOBART, OF WEST LEBANON, INDIANA, ASSIGNOR OF ONE-HALF TO FRANK J. GOODWINE, OF WEST LEBANON, INDIANA.

WEIGHING-SCOOP FOR SCALES.

1,061,841.  Specification of Letters Patent.  Patented May 13, 1913.

Application filed August 28, 1912. Serial No. 717,550.

*To all whom it may concern:*

Be it known that I, DARWIN HOBART, a citizen of the United States, residing at West Lebanon, in the county of Warren and State of Indiana, have invented new and useful Improvements in Weighing-Scoops for Scales, of which the following is a specification.

An object of the invention is to provide a scoop for use on weighing scales.

The invention embodies, among other features, a frame, a scoop mounted to swing on the frame and adapted to receive the product to be weighed, the said scoop being tiltable for the purpose of removing the weighed product therefrom, and means for securing the said frame rigidly on the platform of the scale.

In the further disclosure of the invention reference is to be had to the accompanying drawings, constituting a part of this specification, in which similar characters of reference denote corresponding parts in all the views, and in which:

Figure 1 is a perspective view of the device, showing the same applied to the platform of the scale; Fig. 2 is a horizontal sectional view taken on the line 2—2 in Fig. 1; and Fig. 3 is a vertical sectional view taken on the line 3—3 in Fig. 1.

Referring more particularly to the views, use is made of a frame 10, comprising a series of uprights 11 connected by horizontal side pieces 12 and an end piece 13. A scoop 14 is mounted to swing on the frame 10, the said scoop having a handle 15 at one end thereof and normally reposing on the end piece 13 to retain the scoop 14 in filling position on the frame 10, the said scoop being tiltable in order that the contents thereof can be readily poured or removed therefrom. By referring to Fig. 1 it will be seen that by pivoting the scoop at the forward end, the weight of the rear portion of the scoop and the handle 15 will cause the scoop to gravitate into filling position after the handle is released after the scoop has been raised into filling position, the downward swinging movement of the scoop being limited by the handle 15 engaging the cross piece 13, as shown.

Bars 16, 17 are connected to the uprights 11 at both ends of the frame 10 and are arranged horizontally, and rods 18, provided with handles 19, are journaled on the bar 16 and extend horizontally to connect with adjusting members 20, one of said adjusting members being provided for each bar and the said adjusting members each consisting of a circular disk 20$^a$, an integral handle 20$^b$, a socket 20$^c$, pivoted on the disk 20$^a$ and provided to threadedly receive the end of the bar 18 and a pin 20$^d$ extended from the disk 20$^a$ to limit the swinging movement of the adjusting members 20. Auxiliary rods 21 are arranged to extend through the bar 17 and have pivotal connection with the disks 20$^a$ of the adjusting members 20 as shown, it being readily seen by referring to the views that one of the pins 20$^d$ on one of the adjusting members 20 engages the bar 18 connected thereto to limit the swinging movement of the adjusting member, whereas the pin 20$^d$ on the other adjusting member engages the bar 21 connected thereto to limit the swinging movement of the other adjusting member. The auxiliary rods 21 are preferably provided at their outer ends with threads adapted to receive nuts 22, the said nuts being adapted to abut against the bar 17 as shown. The lower ends of the uprights 11 are notched to form flanges 23 and in applying the device described to a platform 24 of a scale 25, the edges of the platform are received in the notches forming the flanges 23, after which the handles 20$^b$ of the adjusting members 20 are actuated to operate the adjusting members and place the rods 18 and 21 in tension, thus moving the lower ends of the uprights 11 into rigid engagement with the edges of the platform 24 of the scale 25, it being readily seen that by imparting rotation to the rods 18 by actuating the handle 19, the swing of the adjusting members 20 can be varied so that the device described can be accommodated on platforms of various sizes, it being further seen that when the adjusting members are thrown into position to relatively lock the rods 18 and 21 the pins 20$^d$ limit the swinging movement of the adjusting members, as shown in Fig. 1.

From the foregoing description it will be seen that the scoop 14 takes the place of the usual receiving pan on the platform of the scale and, when the contents of the scale have been weighed in the usual manner, the handle end of the scoop is swung upwardly, thus dumping the contents therefrom and into a suitable bag or container provided for the purpose. It will also be seen that when the scoop is returned to filling position, the handle end of the scoop, when the handle is released, will gravitate into filling position and the downward swinging movement of the scoop will be limited by the handle 15 striking the end piece 13.

Having thus described my invention, I claim:

1. In a device of the class described, the combination with the platform of a scale, of a frame consisting of a series of uprights connected by side pieces, an end piece connecting a plurality of the uprights, bars on the front and rear ends of the frame, rods journaled on the rear bars, adjusting members having pivotal connection with the free ends of the said rods, auxiliary rods on the front bar of the said frame and having pivotal connection with the said adjusting members, and pins on the adjusting members for limiting the swinging movement of the adjusting members relatively to the said rods and said auxiliary rods.

2. In a device of the class described, the combination with the platform of a scale, of a frame consisting of a series of uprights connected by side pieces, an end piece connecting a plurality of the uprights, bars on the front and rear ends of the frame, rods journaled on the rear bars, adjusting members having pivotal connection with the free ends of the said rods, auxiliary rods on the front bar of the said frame and having pivotal connection with the said adjusting members, pins on the adjusting members for limiting the swinging movement of the adjusting members relatively to the said rods and said auxiliary rods, and handles on the said rods for adjusting the said rods in threaded engagement with the said adjusting members.

3. In a device of the class described, the combination with the platform of a scale, of a frame consisting of a series of uprights connected by side pieces, an end piece connecting a plurality of the uprights, front and rear bars on the ends of the said frame, rods journaled on the rear bars, auxiliary rods journaled on the front bars, adjusting members having pivotal connection with the said auxiliary rods, heads mounted to swing on the adjusting members and having threaded connection with the said rods, and pins on the adjusting members for limiting the swinging movement of the adjusting members relatively to the said rods and the said auxiliary rods.

4. In a device of the class described, the combination with the platform of a scale, of a frame consisting of a series of uprights connected by side pieces, an end piece connecting a plurality of the uprights, front and rear bars on the ends of the said frame, rods journaled on the rear bars, auxiliary rods journaled on the front bars, adjusting members having pivotal connection with the said auxiliary rods, heads mounted to swing on the said adjusting members and having threaded connection with the said rods, pins on the adjusting members for limiting the swinging movement of the adjusting members relatively to the said rods and the said auxiliary rods, and handles on the said rods for rotating the same for increasing or decreasing the threaded connection of the said rods with the said heads.

5. In a device of the class described, the combination with the platform of a scale, of a frame consisting of a series of uprights connected by side pieces, an end piece connecting a plurality of the uprights, front and rear bars on the ends of the said frame, rods journaled on the rear bars, auxiliary rods journaled on the front bars, adjusting members having pivotal connection with the said auxiliary rods, heads mounted to swing on the said adjusting members and having threaded connection with the said rods, pins on the adjusting members for limiting the swinging movement of the adjusting members relatively to the said rods and said auxiliary rods, handles on the said rods for rotating the same for increasing or decreasing the threaded connection of the said rods with the said heads, a scoop mounted to swing on the said frame and movable into tilting position thereon, and a handle forming a part of the said scoop and adapted to engage the end piece connecting the uprights to limit the tilting movement of the scoop.

In testimony whereof I affix my signature in presence of two witnesses.

DARWIN HOBART.

Witnesses:
 FRANK J. GOODWINE,
 CHARLES B. BRINKER.

---

Copies of this patent may be obtained for five cents each, by addressing the "Commissioner of Patents, Washington, D. C."